United States Patent
Nübling et al.

(10) Patent No.: US 8,561,907 B2
(45) Date of Patent: Oct. 22, 2013

(54) FLICKER-FREE ILLUMINATION APPARATUS

(75) Inventors: Ralf Ulrich Nübling, Denzlingen (DE); Roland Gehring, Elzach-Prechtal (DE)

(73) Assignee: Sick AG, Waldkirch (DE)

( * ) Notice: Subject to any disclaimer, the term of this patent is extended or adjusted under 35 U.S.C. 154(b) by 83 days.

(21) Appl. No.: 13/269,045

(22) Filed: Oct. 7, 2011

(65) Prior Publication Data
US 2012/0111947 A1  May 10, 2012

(30) Foreign Application Priority Data
Nov. 5, 2010  (DE) .......................... 10 2010 050 577

(51) Int. Cl.
*G06K 7/00*  (2006.01)

(52) U.S. Cl.
USPC ........... 235/470; 235/435; 235/439; 235/451; 235/462.01

(58) Field of Classification Search
USPC .......................... 235/435, 439, 454, 455, 462
See application file for complete search history.

(56) References Cited

U.S. PATENT DOCUMENTS

| | | | |
|---|---|---|---|
| 7,234,641 B2 * | 6/2007 | Olmstead | 235/454 |
| 2008/0063410 A1 | 3/2008 | Irie | |
| 2010/0165160 A1 | 7/2010 | Olmstead et al. | |

FOREIGN PATENT DOCUMENTS

| | | |
|---|---|---|
| DE | 103 49 553 A1 | 1/2005 |
| EP | 2 048 596 A1 | 4/2009 |
| EP | 2 073 144 A2 | 6/2009 |

OTHER PUBLICATIONS

German Examination Report dated Jul. 29, 2011, issued in corresponding German Application No. 10 2010 050 577.3, six (6) pages.
European Search Report, Application No. EP 11 18 0495, dated Mar. 19, 2012, five (5) pages.

* cited by examiner

*Primary Examiner* — Michael G Lee
*Assistant Examiner* — Matthew Mikels
(74) *Attorney, Agent, or Firm* — Nath, Goldberg & Meyer; Jerald L. Meyer; Scott C. Langford

(57) ABSTRACT

A flicker-free illumination apparatus (28) for a code reader (10) has an illumination control (26) which is configured for a pulsed operation with an illumination intensity varying between light pulses (30) and pulse pauses (32). The illumination control (26) is further configured to maintain a non-zero illumination intensity during the pulse pauses (32), such that a basic intensity (34) remains.

12 Claims, 3 Drawing Sheets

FLICKER-FREE ILLUMINATION APPARATUS

Figure 1:
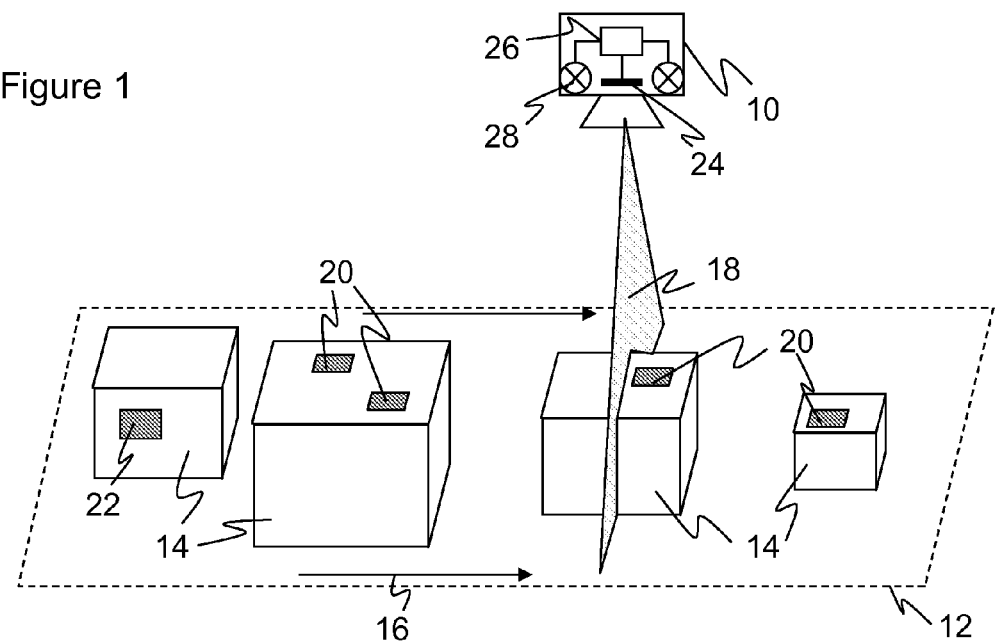

The invention relates to a flicker-free illumination device for a code reader and a corresponding method according to the disclosed subject matter.

Code readers are known from supermarket checkouts, for automatic packet identification, sorting of mail, from baggage handling at airports and other logistics applications. With the advancements in digital camera technology, the widely used bar code scanners are more and more replaced by camera-based code readers. Instead of scanning code areas, a camera-based code reader takes images of the objects bearing the codes by means of a CCD Chip, and image evaluation software extracts the code information from the images. Camera-based code readers can easily handle code types other than one-dimensional bar codes that are two-dimensional like a matrix code and contain more information.

In an important class of applications, the objects bearing the codes are conveyed past the code reader. A line camera reads the object images with the code information successively and line by line with the relative motion. In order for the objects to be arranged on the conveyor in arbitrary orientation, several code readers are often provided at a reading tunnel to image objects from several or all perspectives.

A code reading being as free of errors as possible requires a sufficient illumination of the code area. The ambient light is rarely sufficient, and in a reading tunnel the ambient light is shielded in any case. Code readers are equipped with a very bright and powerful illumination to additionally illuminate the reading area.

During capturing codes on moving objects the illumination is operated with pulses to prevent motion blur. The pulsed operation also saves energy and provides thermal advantages. However, if the flash sequence has a frequency that is discernible by the human eye, this leads to a flicker for people in the vicinity of the code reader that is perceived as unpleasant and can even trigger epileptic seizures in extreme cases. With increasing demands on the code readers requiring even higher flash energies, the irritating or even harmful effects will increase even more.

There is in principle the possibility of avoiding the visible spectrum and using for example an infra red illumination. Then, the flickering is no longer perceived. However, valuable image information is also lost that could for example be used to detect objects or code areas.

U.S. Pat. No. 7,234,641 B2 resorts to a code reader operated at a higher pulse frequency beyond the human perception threshold. This, however, fixes the pulse frequency to values that do not, at least in many applications, correspond to the optimal image repetition frequency for the reading of codes.

From US 2008/0063410 A1 an optical communication system is known, where additional light sources are activated during optical information transmission in pulse pauses of the information transmission, so that from outside a uniform light distribution is perceived. This, however, requires a comparably complicated determination of the required activation of the additional light sources. Most notably, this procedure cannot be used in a code reader, because the reading area would be illuminated homogenously, and the advantages of a pulsed illumination would be lost.

It is therefore an object of the invention to provide a pulsed illumination for a code reader that does not adversely affect nearby persons.

This object is satisfied by a flicker-free illumination apparatus, a camera-based code reader, and a method for the flicker-free illumination of the reading area of a code reader, according to the disclosed subject matter. The invention starts from the basic idea to reduce differences between light pulses and pulse pauses to a degree where the main advantages of a stroboscopic illumination are maintained from a technical point of view and at the same time a nearby person is not adversely affected anymore. This is achieved by not reducing the illumination intensity to zero during pulse pauses, i.e. not deactivating the illumination apparatus, but maintaining a basic intensity. The basic intensity is selected high enough that the difference to the light pulses is no more or at least hardly perceived as annoying to the human eye. This is supported by the logarithmic perception of the human eye that perceives an intensity difference that is quite large in absolute measure as less pronounced than the electronics.

The invention has the advantage that a pulsed illumination can also be used at pulse frequencies that in themselves would be perceived as irritating to a human observer. This makes it possible to satisfy both the technical requirements, i.e. short light flashes to avoid motion blur, and the human demands for an agreeable working environment.

The illumination apparatus preferably comprises a plurality of illumination units. In this and subsequent paragraphs, the term preferably describes preferred, but optional features that are not necessarily required for the invention. With the plurality of illumination units, the required light intensity is achieved in a desired illumination area. The illumination units are preferably light emitting diodes, because they have the required high output power with a good controllability for a reduced light emission and at the same time durability and high light emitting efficiency. It is also possible to use other diodes, like laser diodes.

Respective illumination apparatuses of different code readers of a reading system can also be understood to be illumination units, where these apparatuses may possibly also each have a plurality of light emitting diodes or laser diodes. Such reading systems, that are in most instances designed as reading tunnels, enable in a stationary mounting to detect object surfaces from all directions. Through cooperative timing of the pulsing of the individual illumination apparatuses of the code readers involved, the basic intensity is set during the pulse pauses. Thus, although it is not necessarily ensured that an individual code reader is flicker-free, nearby persons at the most see a barely perceptible flicker from the reading system as a whole.

Instead of synchronously reducing all illumination units to a certain non-zero base level in the pulse pauses, it is also conceivable to form groups within the illumination units and to achieve the desired behaviour of the resulting overall illumination by a different control of the groups. Two groups or subsets of the illumination units usually suffice, where a first subset is a selection of the illumination units and a second subset is the complement of the first subset.

Then, in a first alternative, the illumination control is preferably configured to activate and deactivate a first subset of the illumination units with a pulse frequency and to maintain continuous operation of a second subset of the illumination units. This is a particularly simple implementation for achieving the desired basic intensity. That level may be set by the cardinal number of the first subset and the second subset, i.e. the number of illumination units in a pulsed and continuous operation, respectively.

In another alternative, the illumination control is preferably configured to deactivate a first subset of the illumination units during the pulse pauses and to reduce a second subset of the illumination units to a non-zero illumination intensity during the pulse pauses. Thus, the first subset is treated as in the prior art, and its illumination units are pulsed in a conventional on-off-cycle. The basic intensity is provided by the second subset that is reduced to a non-zero base level in the pulse pauses. Compared to a solution where all illumination units transmit a residual intensity in the pulse pauses, for this alternative a higher basic level has of course to be set for the second subset in case the resulting overall illumination is to maintain the same basic intensity.

In another alternative, the illumination control is preferably configured to activate and deactivate a first subset of the illumination units and a second subset of the illumination units in a staggered sequence. Due to the staggered overlap of active and inactive illumination units, the desired pattern of light pulses with high output power and pulse pauses with reduced but non-zero basic intensity emerges in the resulting overall illumination.

The illumination control is preferably configured to generate the basic intensity by small light pulses at a pulse frequency higher than human perception. The basic intensity in the pulse pauses is thus not achieved by continuous operation with reduced intensity, but again by a pulsed illumination. These short pulses are not to be confused with the actual light pulses, since they are only used in the pulse pauses and do not serve as illumination for the code reader. One advantage is that the amplitude can remain constant, thus the same current and even the same control circuit can be used to generate the basic intensity.

The ratio of illumination intensity during the light pulses to illumination intensity during the pulse pauses is preferably at most 10/1, in particular at most 4/1. Then, the basic intensity is low enough to maintain the advantages of a pulsed illumination for the electronics, and the alteration between basic intensity and light pulse is at the same time not seen as irritating due to the logarithmic perception of the human eye.

A pulse frequency of the alteration between light pulses and pulse pauses is preferably in the range from 1 Hz to 100 Hz, in particular in the range of 15 Hz and 85 Hz. Slower pulse frequency are no longer perceived as a flickering, but as slowly alternating individual images, whereas shorter pulse alterations are no more resolved by the human eye. The invention, therefore, opens up the frequency ranges as defined above without an irritating flickering. It may also be useful to apply the invention to lower or higher pulse frequencies to account for individual differences in perception or unconscious perceptions. The illumination apparatus preferably transmits light in a visible spectrum. Otherwise, the flickering would anyway not be perceived.

In another embodiment, a camera-based code reader is preferably provided, in particular a stationary code reader for reading codes in a relative motion of the code reader and the objects bearing the codes, that comprises any variant of the illumination apparatus as described above. In addition, the code reader has an image sensor for taking images of objects with codes to be read as well as an evaluation unit for the decoding of code data from the images. Such code readers require a high-intensity illumination of the detection area, and sharp images without compromising by motion during the exposure time facilitate the decoding.

The code reader is preferably designed as a line camera that takes a respective image line during a light pulse, wherein the evaluation unit is configured to stitch successive image lines to an image of the object. Here, the frame rate has to be adapted to the conveyor velocity for a desired image resolution, i.e. the distance of two subsequently taken image lines. Therefore, pulse frequencies are often required that would lead to an irritating flickering without the illumination apparatus according to the invention.

The method in accordance with the invention can be further developed in a similar manner with additional features and shows similar advantages. Such advantageous features are described in an exemplary, but not exclusive manner in the subordinate claims following the independent claims.

Figure 2A:
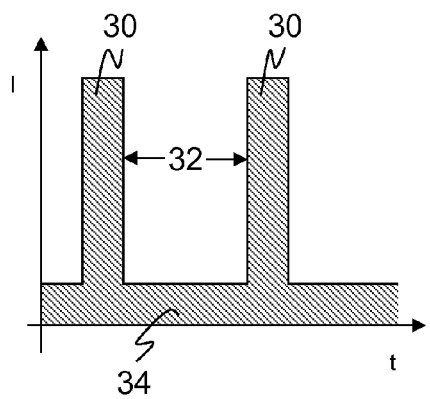
Figure 2B:
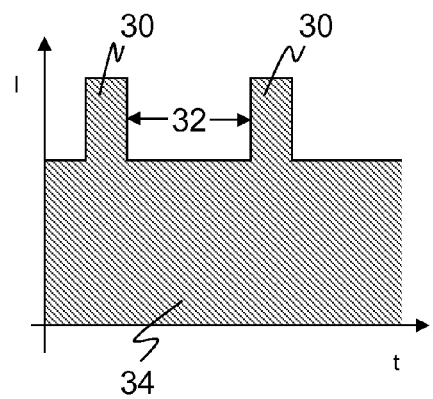
Figure 3A:
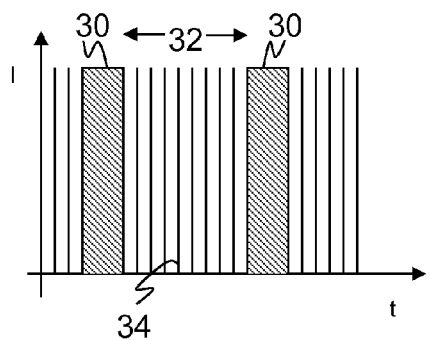
Figure 3B:
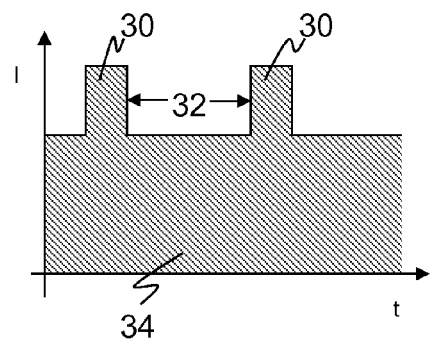
Figure 4A:
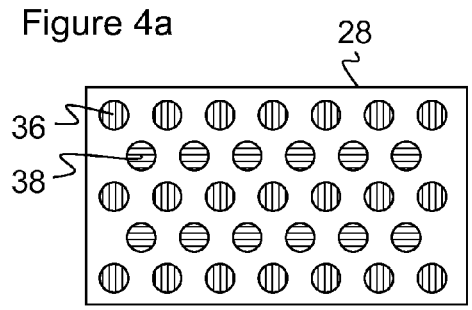
Figure 4B:
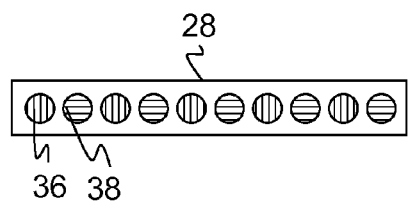
Figure 5A:
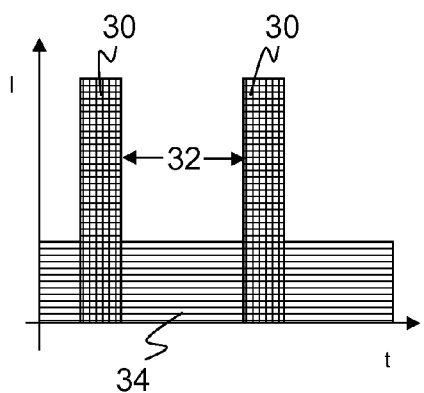
Figure 5B:
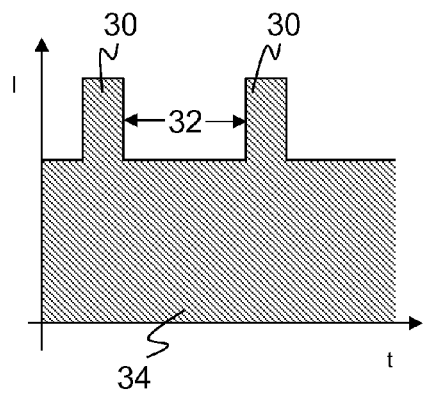
Figure 6A:
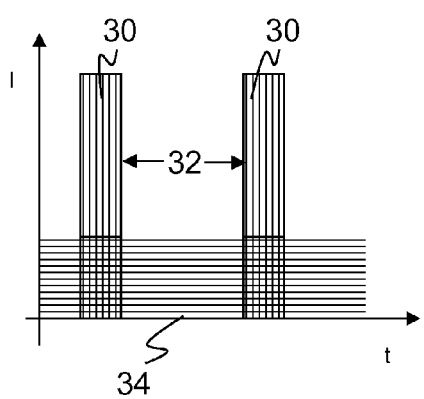
Figure 6B:
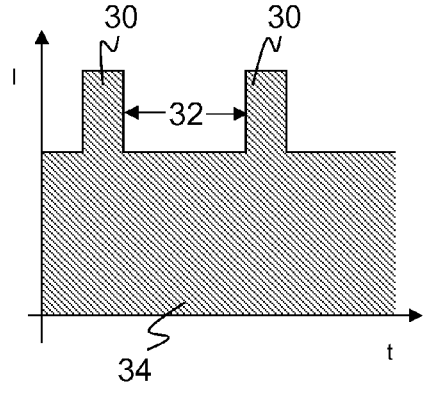
Figure 7A:
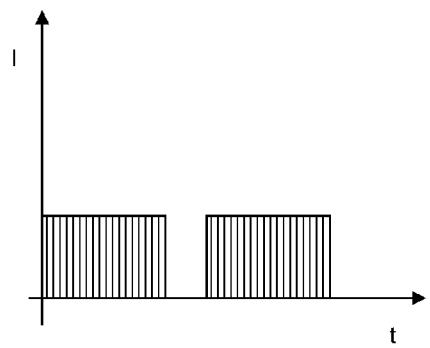
Figure 7B:
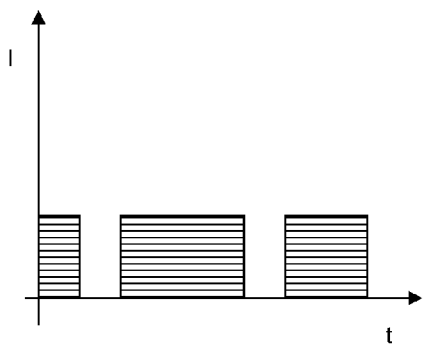
Figure 7C:
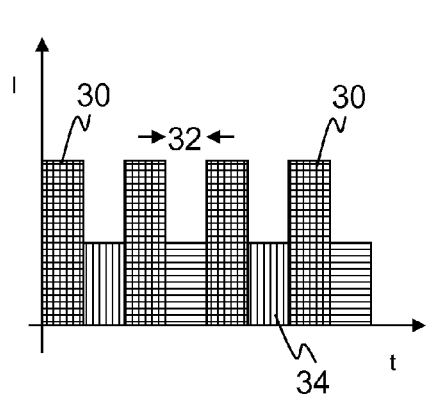
Figure 7D:
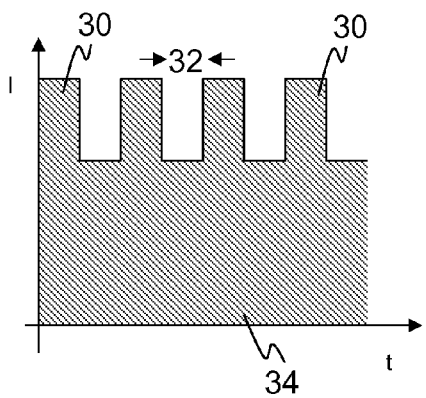
Figure 8A:
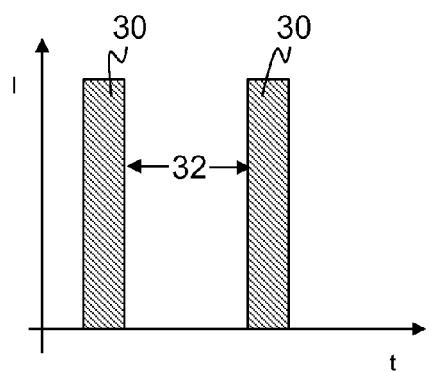
Figure 8B:
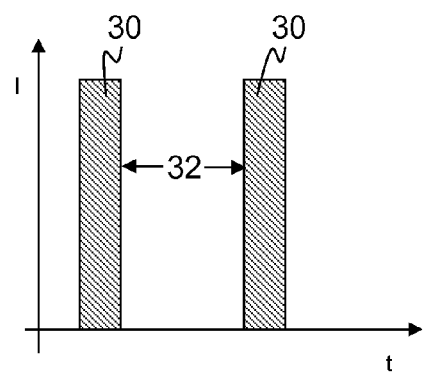

The invention will be explained in the following also with respect to further advantages and features with reference to exemplary embodiments and the enclosed drawing. The Figures of the drawing show in:

FIG. 1 a schematic three-dimensional overview of a code reader with an illumination mounted at a conveyor belt on which objects bearing the codes to be read are conveyed;

FIG. 2a a time-dependent intensity profile for a first pulse scheme where all illumination units are reduced to a non-zero basic intensity in the pulse pauses;

FIG. 2b the time-dependent intensity profile of FIG. 2a as perceived by a human observer;

FIG. 3a a time-dependent intensity profile similar to FIG. 2a, where the basic intensity is generated by short light pulses with a frequency beyond the perception threshold;

FIG. 3b the time-dependent intensity profile of FIG. 3a as perceived by a human observer;

FIG. 4a a schematic representation of the arrangement of two groups of illumination units in an illumination apparatus;

FIG. 4b a representation similar to FIG. 4a in an embodiment as a line-shaped illumination;

FIG. 5a a time-dependent intensity profile for another pulse scheme where only a part of the illumination units are reduced to a non-zero basic intensity in the pulse pauses;

FIG. 5b the time-dependent intensity profile of FIG. 5a as perceived by a human observer;

FIG. 6a a time-dependent intensity profile for another pulse scheme where a part of the illumination units remains in continuous operation;

FIG. 6b the time-dependent intensity profile of FIG. 6a as perceived by a human observer;

FIG. 7a a time-dependent intensity profile of a first group of illumination units in another pulse scheme;

FIG. 7b a time-dependent intensity profile of a second group of illumination units in the pulse scheme of FIG. 7a;

FIG. 7c a time-dependent intensity profile of the superposition of the two groups of FIGS. 7a and 7b;

FIG. 7d the time-dependent intensity profile of FIG. 7c as perceived by a human observer;

FIG. 8a a time-dependent intensity profile for a pulse scheme according to the prior art, where the illumination units are deactivated in the pulse pauses; and FIG. 8b the time-dependent intensity profile of FIG. 8a according to the prior art as perceived by a human observer.

FIG. 1 shows a code reader 10 mounted above a conveyor belt 12 conveying objects 14, as indicated by the arrow 16, through a detection area 18 of the code reader 10. The objects 14 bear code areas 20 at their outer surfaces that can be detected and evaluated by the code reader 10. These code areas 20 can only be detected by the code reader 10 if they are arranged on the top face or at least visibly from above. Therefore, differing from the representation in FIG. 1, a plurality of code readers 10 can be mounted from different directions to read codes 22 for example arranged at one side or on the bottom, thus enabling a so-called omni reading from all directions. The plurality of code readers 10 in a reading system are in practice usually arranged in a reading tunnel.

The detection area 18 of the code reader 10 is represented as a single plane in FIG. 1 that corresponds to a line-shaped image sensor 24 of the code reader, for example a CCD or CMOS chip with a matrix-shaped or a line-shaped arrangement of photosensitive pixel elements. As the objects 14 are imaged line by line in the conveyor direction 16, by and by a complete image of the conveyed objects 14 is generated.

As an alternative to this line by line scanning, other sections can also be imaged. For example, larger areas of several lines can be imaged at the same time. In case the additional effort for the stitching of a complete image is accepted, any arbitrary geometry of the individually imaged sections can also be used. The stitching to a complete image is relatively easily done at a uniform conveying of the objects 14 in a stationary mounting, in particular if the conveyor device 16 provides position or velocity data. Nevertheless, it is conceivable to use the sensor 10 as a mobile device, for example a hand-held device, which is moved over the respective area to be read.

The task of the code reader 10 is to identify the code areas 20 and to read the codes therein, decode them and assign them to a respective corresponding object 14. To this end an evaluation unit 26 is provided that receives the signals of the image sensor 24 and reads the code by means of image processing.

The code reader 10 includes an illumination 28 that illuminates the reading area in the detection area 18. The illumination 28 can have a single light source, but usually comprises a plurality of individual light sources and is operated in a pulsed manner that is explained in detail in the following with reference to FIGS. 2 to 7. The activity and intensities of the illumination 28 is controlled by an illumination control that is represented in FIG. 1 as integrated into the evaluation unit 26, but may also be a separate component.

FIG. 8a shows a pulse scheme with a conventional pulse operation as a time-dependent intensity profile. During the light pulses 32, the illumination is operated at a high or even maximal output power. In contrast, during the pulse pauses 32 in between two respective light pulses 30, the illumination is deactivated. The difference in intensity, as shown in FIG. 8b, is fully perceived by the human eye, leading to an irritating flickering.

Therefore, according to the invention, while the illumination 28 is operated at a high pulse power during the light pulses 30, it is not reduced to zero during the pulse pause 32, but a basic intensity is maintained. In conjunction with the logarithmic intensity perception of the human eye, the flickering can thus be suppressed or be set to acceptable properties by an optimization of the pulse and pause intensities, respectively.

FIG. 2a shows a first embodiment of a pulse scheme, where pulse schemes are represented similar to FIG. 8 as a time-dependent brightness or intensity profile. During the pulse pauses 32, the illumination 28 remains activated with a basic intensity 34. This virtually corresponds to an optical biasing or a positive offset of the illumination intensity.

FIG. 2b shows the effect on the human perception. Due to the logarithmic intensity sensitivity of the eye, the basic intensity 34 is more noticeably perceived in relation to the light pulses 30, so that the effective intensity difference between light pulse 30 and basic intensity 34 during the pulse pauses 32 is substantially reduced. Therefore, the light pulse 30 has an effect for the image sensor 24 similar to the pulse scheme according to the prior art shown in FIG. 8, but it is not irritating any more for the human observer, or at least considerably less so. This effect can be optimized by a suitable choice of the basic intensity 34.

The alteration between light pulse 30 and basic intensity 34 can not only be realized as in FIG. 2 by synchronously and commonly reducing the light source or all light sources to a homogenous basic intensity 34 during the pulse pauses 32. It is sufficient if the basic intensity 34 results on average.

Therefore, instead of a continuous operation with reduced intensity, as was explained with reference to FIG. 2a, also a pulsed illumination can be used in the pulse pauses 32. This is illustrated in FIG. 3a. In between the actual light pulses 30, short pulses are produced for the generation of the basic intensity 34 at a pulse frequency that is beyond the human perception threshold. Thus, these short pulses are not perceived as pulses, but merge into a homogenous illumination for the observer. This is represented in FIG. 3b.

For the alteration between light pulse 30 and basic intensity 34, individual light sources can also be differently operated in a specified way. FIG. 4a shows an exemplary embodiment of an illumination 28 with a plurality of illumination units 36 in a first group and a plurality of illumination units 38 in a second group. The illumination units 36, 38 are, for example, individual or several LEDs. As an alternative, each illumination unit 36, 38 can also be understood as the respective illumination 28 of several code readers 10 that are combined in a reading system for an omni reading.

The illumination units 36, 38 do not differ in their inner constitution from group to group, but this is also possible. Moreover, additional groups can be formed, although this is not necessary for the pulse schemes as described and may unnecessarily complicate the illumination control. The geometric arrangement of the illumination units 36, 38 within the illumination 28 is to be understood merely as an example. It is only required that the illuminated areas of the illumination units 36, 38 merge to a sufficient degree. FIG. 4b shows one other embodiment of the illumination 28 out of a variety of possible alternative arrangements, forming a line-shaped illumination.

FIG. 5a shows an alternative pulse scheme. The hatching of the intensity profile corresponds to the activated groups of illumination units 36, 38 in FIG. 4. In case both groups are active, the vertical hatching of the first group and the horizontal hatching of the second group superimpose in a box pattern.

Instead of reducing the entire illumination 28 or all illumination units 36, 38, respectively, to the basic intensity 34 in the pulse pauses 32, as in FIG. 2a, in the embodiment according to FIG. 5a the first group of illumination units 36 is completely deactivated in the pulse pauses 32, so that the basic intensity 34 is maintained solely by the second group of illumination units 28. FIG. 5b shows the corresponding perception by the human eye analogous to FIG. 2b. Little or no irritating flicker is perceived.

Another alternative pulse scheme is shown in FIG. 6a. In this embodiment, the second group of illumination units 38 is not at all involved in the light pulses 30, but provides the basic intensity 34 by continuous operation. The basic intensity 34 is superimposed by the first group of illumination units 36. Here, the illumination units 36 of the first group are either completely deactivated or reduced to the basic intensity 34 in the pulse pauses 34. Again, FIG. 6b shows the corresponding perception by the human eye that does not differ from FIG. 5b for a suitable choice of the basic intensity 34.

Yet another pulse scheme is explained in FIG. 7. Here, both groups of illumination units 36, 38 are operated in staggered activity cycles that in superposition lead to the desired pulse behavior with reduction to the basic intensity 34 in the pulse pauses 32. FIG. 7a shows the activity cycle of the first group of illumination units 36, and FIG. 7b shows the activity cycle of the second group of illumination units 38. In this example, a regular cycle of three time units of activity and one time unit of inactivity is shown. The invention also includes a different timing and more complicated cycles.

FIG. 7c shows the superposition of the activity cycles according to FIGS. 7a and 7b. A uniform alteration of light pulses 30 of maximal activity and pulse pauses 32 emerges, where during the pulse pauses 32 the basic intensity 34 is maintained by one of the two groups of illumination units 36, 38. FIG. 7d shows in analogy to FIG. 2b, 3b, 5b, or 6b the human perception that scales logarithmically with the brightness and therefore lets the distance between the light pulses 30 and the basic intensity 34 be perceived significantly lower and thus largely flicker-free.

Although the various pulse schemes are discussed individually with reference to FIGS. 2 to 7, the invention also includes hybrid embodiments. It is in principle possible, based on the implementations as described, to define different activity cycles up to an individual activity cycle for each individual illumination unit 36, 38 to obtain, in superposition, light pulses 30 and a sufficiently high basic intensity 34 during the pulse pauses 32. The basic intensity 34 can be achieved both by a reduction of the intensity itself, i.e. for example the current, and by short light pulses as explained with reference to FIG. 3 which can be analogously transferred to the other embodiments.

Similarly, the representation of light pulses 32 as rectangular pulses is purely by way of example, and other pulse shapes also achieve the desired flicker-free illumination effect. The amplitudes of the light pulses 30 and the basic intensity 30 are adapted to find a balance between a sufficiently large distance of bright and dark for the electronics on the one hand and a distance of bright and dark being as small as possible for a largely flicker-free perception on the other.

The invention claimed is:

1. A flicker-free illumination apparatus (28) for a code reader (10), the apparatus comprising:
    an illumination control (26) which is configured for a pulsed operation with an illumination intensity varying between light pulses (30) and pulse pauses (32);
    wherein the ratio of illumination intensity of the light pulses (30) to illumination intensity during the pulse pauses (32) is at most 10/1;
    wherein a pulse frequency of the pulsed operation of alternating light pulses (30) and pulse pauses (32) is in the range from 1 Hz to 100 Hz; and
    wherein the illumination control (26) is further configured to maintain a non-zero illumination intensity during the pulse pauses (32), such that a basic intensity (34) remains.

2. The illumination apparatus (28) according to claim 1, comprising a plurality of illumination units (36, 38), wherein the illumination units (36, 38) are light emitting diodes, laser diodes or respective illumination apparatuses of different code readers (10) of a reading system.

3. The illumination apparatus (28) according to claim 2, wherein the illumination control (26) is configured to activate and deactivate a first subset of the illumination units (36) with a pulse frequency and to maintain continuous operation of a second subset of the illumination units (38).

4. The illumination apparatus (28) according to claim 2, wherein the illumination control (26) is configured to deactivate a first subset of the illumination units (36) during the pulse pauses (32) and to reduce a second subset of the illumination units (38) to a non-zero illumination intensity (34) during the pulse pauses (32).

5. The illumination apparatus (28) according to claim 2, wherein the illumination control (26) is configured to activate and deactivate a first subset of the illumination units (36) and a second subset of the illumination units (38) in a staggered sequence.

6. The illumination apparatus (28) according to claim 1, wherein the illumination control (26) is configured to generate the basic intensity (34) by small light pulses at a pulse frequency higher than human perception.

7. The illumination apparatus (28) according to claim 1, wherein the ratio of illumination intensity during the light pulses (30) to illumination intensity during the pulse pauses (32) is at most 4/1.

8. The illumination apparatus (28) according to claim 1, wherein the illumination apparatus (28, 36, 38) transmits light in a visible spectrum.

9. A camera-based code reader (10) comprising
    a flicker-free illumination apparatus, the apparatus having an illumination control (26) which is configured for
    a pulsed operation with an illumination intensity varying between light pulses (30) and pulse pauses (32), wherein a pulse frequency of the pulsed operation of alternating light pulses (3) and pulse pauses (322) is at most 10/1; and
    to maintain a non-zero illumination intensity during the pulse pauses (32), such that a basic intensity (34) remains, wherein a pulse frequency of the pulsed operation of alternating light pulses (30) and pulse pauses (32) is in the range from 15 Hz to 85 Hz; and
    wherein the camera-based code reader (10) comprises an image sensor (24) for taking images of objects (14) with codes (20, 22) to be read and an evaluation unit (26) for the decoding of code data from the images.

10. The code reader (9) of claim 9,
    the code reader (10) being a stationary code reader for reading codes in a relative motion of the code reader (10) and the objects (14) bearing the codes (20, 22).

11. The code reader (9) of claim 10,
    the code reader (10) being designed as a line camera that takes a respective image line during a light pulse (30), wherein the evaluation unit (26) is configured to stitch successive image lines to an image of the object (14, 20, 22).

12. A method for flicker-free illumination of a reading area (18) of a code reader (10), wherein the illumination intensity varies in a pulsed operation between light pulses (30) and pulse pauses (32), wherein a pulse frequency of the pulsed operation of alternating light pulses (30) and pulse pauses (32) is in the range from 1 Hz to 100 Hz; and
    wherein the reading area (18) is illuminated with a non-zero illumination intensity during the pulse pauses (32), such that a basic intensity (34) remains, wherein the ratio of illumination intensity of the light pulses (30) to illumination intensity during the pulse pauses (32) is at most 10/1.

* * * * *